United States Statutory Invention Registration [19]

[11] Reg. Number: H643

Drury, Jr. [43] Published: Jun. 6, 1989

[54] PROCESS FOR THE PREPARATION OF GLYCOSIDE-CONTAINING POLYESTER RESIN MATERIALS

[75] Inventor: Raymond L. Drury, Jr., Decatur, Ill.

[73] Assignee: A. E. Staley Manufacturing Company, Decatur, Ill.

[21] Appl. No.: 735,939

[22] Filed: May 17, 1985

[51] Int. Cl.[4] ..... C08G 65/00; C08G 59/42; C08G 59/40

[52] U.S. Cl. ..... 536/119; 536/115

[58] Field of Search ..... 536/119, 115

[56] References Cited

U.S. PATENT DOCUMENTS

| | | | |
|---|---|---|---|
| 3,321,419 | 5/1967 | Kennedy | 260/404.5 |
| 4,181,638 | 1/1980 | Lasher | 525/167.5 |
| 4,334,061 | 6/1982 | Bossier, III | 536/119 |
| 4,413,119 | 11/1983 | Reuter et al. | 528/307 |
| 4,517,360 | 5/1985 | Volpenheir | 539/119 |

OTHER PUBLICATIONS

Migrdichian *Organic Syn. Thesis,* vol. 1, 1957, p. 323.
Gibbons *Paint and Varnish,* 10–1958, pp. 57–63.

*Primary Examiner*—John F. Terapane
*Assistant Examiner*—Daniel S. Metzinaier

[57] ABSTRACT

An improved process is provided for the manufacture of polyester or alkyd resin materials via the reaction of a polybasic acid or anhydride component with a polyol component containing at least a minor proportion of an alkyl, alkenyl or aryl glycoside or polyglycoside material. In the improved process, the reaction temperature is maintained below about 185° C. until the reaction has reached at least about 50 percent of completion. In an especially preferred embodiment, the polyester or alkyd resin to be produced is an aromatic polybasic acid or anhydride-based, glycoside-containing material and the improved process of the invention further comprises substituting an aliphatic polybasic acid or anhydride material for a minor proportion of the aromatic polybasic acid or anhydride component thereof. The improved process of the present invention provides alkyl, alkenyl or aryl glycoside-containing polyester or alkyd resins having substantially better color (i.e., reduced color development) relative to that characteristically exhibited by comparable polyester or alkyd resin products prepared via conventional polyester or alkyd resin manufacturing processes or techniques.

18 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR THE PREPARATION OF GLYCOSIDE-CONTAINING POLYESTER RESIN MATERIALS

BACKGROUND OF THE INVENTION

The present invention pertains to the preparation of polyester resin materials via the reaction of a polybasic acid or anhydride with a polyol reactant. More particularly, the present invention relates to an improved process for preparing polyester resins of the sort wherein the polyol reactant contains at least a minor proportion of an alkyl, alkenyl or aryl glycoside component.

Polyester resins are a known class of polymeric compounds which are generally thought of or characterized as being the reaction product of polyhydric alcohols and polybasic acids. Such resins can vary widely in terms of their physical and chemical characteristics or properties depending upon the identity and nature of the specific polybasic acids and polyols chosen for their manufacture, the molecular weight of the final polyester product, and the like. Such resins find a wide range of practical uses such as in molded articles, paint and coating applications, adhesive applications, etc.

Alkyd resins are a particular type of polyester resin, namely polyester resins which have been modified with monobasic fatty acids, which find widespread and beneficial use in protective coating applications such as, for example, in industrial coatings, paints and the like. See for example U.S. Pat. No. 4,181,638 to Lasher (issued Jan. 1, 1980) which discloses a crosslinkable, high solids polyester resin-based coating composition. Said composition comprises a low molecular weight polyester resin and an aminoplast resin which provides cross-linking upon cure. According to this patent, the low molecular weight polyester resin component is preferably prepared by reacting a cyclic dicarboxylic acid or anhydride with a mixture of mono- and di-fatty esters of triols such as glycerol, trimethylol propane and the like. In preparing said polyester resins, the reactants are charged to a heated reactor vessel along with a reflux solvent such as n-heptane, xylene or toluene and an acid catalyst such as phosphoric acid or sulfuric acid; the reaction mixture is blanketed with an inert gaseous atmosphere (e.g., carbon dioxide); and the reaction is conducted at a temperature below about 150° C. until the reaction is about 90 percent complete, after which the reaction is completed at a temperature of from 175° to about 190° C.

Any number of polybasic acids and polyhydric alcohols can theoretically be employed to prepare polyester resins. However, as a practical matter, phthalic anhydride is one of the more commonly used polybasic acids, particularly for alkyd resin applications, and glycerol and pentaerythritol are quite commonly used as the polyhydric alcohol component. Frequently, mixtures of pentaerythritol with glycerol or with ethylene glycol are used to effectively reduce the pentaerythritol functionality and to thereby control the degree of cross-linking in the resulting pentaerythritol-based polyester resin product. In alkyd resin systems, mixtures of phthalic anhydride with a minor proportion (e.g., from 1 to 10 weight percent based on phthalic anhydride weight) of maleic or fumaric acid are sometimes employed to achieve improved color, processing time, and water resistance in phthalic anhydride-based alkyd resin products.

As is noted briefly above, it is common practice to employ selected mixtures of polybasic acids and/or selected mixtures of polyhydric alcohols to control the ultimate physical and chemical characteristics of the polyester resin material to be produced. For example, one of the various polyhydric co-polyols which has been suggested for use in alkyd resin manufacture is methyl glucoside. For example, in an article by J. P. Gibbons entitled "Methyl Glucoside," *Paint and Varnish Production,* Vol. 48, No. 11, October 1958 (pages 57–63) there is discussed the preparation of methyl glucoside-containing oil-modified alkyd resins by alcoholysis of triglycerides with methyl glucoside followed by reaction of the resulting alcoholysis product with dibasic acid materials such as tetrahydrophthalic or maleic anhydrides, or fumaric, succinic, adipic, sebacic or azelaic acids. In said article, it is noted that when methyl glucoside-containing oil-modified alkyd resins of the sort described above are prepared using phthalic anhydride as the dibasic acid component very dark-colored alkyd resin products are produced.

Since alkyl glycosides such as methyl glucoside represent economically attractive polyol components for potential use in polyester resin manufacturing operations, it would be highly desirable to provide a process by which alkyl (or alkenyl or aryl) glycoside-containing polyester resins having improved color characteristics could be satisfactorily manufactured. Additionally, since phthalic anhydride is a commonly used dibasic acid component in polyester resin manufacture, it would be extremely desirable to provide a process by which alkyl (or alkenyl or ary) glycoside-containing, phthalic anhydride-based polyester resins having commercially acceptable color characteristics could be satisfactorily produced.

SUMMARY OF THE INVENTION

It has now been discovered that alkyl (or alkenyl or aryl) glycoside or polyglycoside-containing polyester resin materials having improved color characteristics can be suitably prepared by conducting the esterification reaction between the polybasic acid or anhydride and polyol components in a fashion such that the reaction temperature is maintained below about 185° C. until said esterification reaction is at least about 50 percent complete. Accordingly, the present invention, in one of its aspects, is an improved process for preparing a polyester resin by the reaction of a polybasic acid or anhydride with a polyol reactant containing at least a minor proportion (by weight and based upon the total weight of said polyol reactant) of an alkyl, alkenyl or aryl glycoside or polyglycoside material at an elevated temperature and wherein the improvement comprises:

conducting said reaction in a fashion such that the reaction temperature is maintained below about 185° C. until at least about 50 percent of the total carboxyl groups of the acid or anhydride component has been reacted to form ester functionalities.

Polyester resin products prepared in accordance with the aforementioned process have improved color characteristics relative to comparative glycoside-containing polyester resins prepared in the conventional fashion by conducting the entire esterification reaction at temperatures substantially in excess of 185° C. (such as, for example, in the range of from 230° to 240° C.).

It has also been discovered that the normally poor color characteristics of alkyl (or alkenyl or aryl) glycoside-containing, aromatic dibasic acid or anhydride-based (e.g., phthalic anhydride-based) polyester resins can be substantially improved by replacing a minor proportion (by weight) of said aromatic dibasic acid or anhydride with an aliphatic acid or anhydride and by then conducting at least the initial stages of the esterification reaction at the temperature below about 185° C. in the fashion noted above. Thus, in another aspect, the present invention is an improved process for preparing a polyester resin by the reaction of an aromatic dibasic acid or anhydride with a polyol reactant containing at least a minor proportion (by weight and based upon the total weight of said polyol reactant) of an alkyl, alkenyl or ayl glycoside or polyglycoside material at an elevated temperature and wherein the improvement comprises:

a. replacing a minor proportion (by weight) of said aromatic dibasic acid or anhydride with an aliphatic dibasic acid or anhydride; and
b. conducting said reaction in a fashion such that the reaction temperature is maintained below about 185° C. until at least about 50 percent of the total carboxyl groups of the acid or anhydride component has been reacted to form ester functionalities.

The present invention is applicable to glycoside-containing polyester resins in general and is especially beneficial when employed in connection with glycoside-containing alkyd resin materials. Indeed, alkyd resin products prepared in accordance with the present invention typically have commercially acceptable color along with excellent practical performance characteristics such as air dry film hardness, adhesion, flexibility, chemical resistance and the like.

DETAILED DESCRIPTION OF THE INVENTION

The polyol reactant component employed in the practice of the present invention contains at least a minor proportion of an alkyl, alkenyl or aryl glycoside material. Typically, such glycoside materials will correspond to the formula:

$$R—O\text{-}(R^1\text{-}O)_y(Z)_x A$$

wherein R is an alkyl, alkenyl or aryl group (generally containing from 1 to about 30, preferably from 1 to about 18 and most preferably from 1 to about 6, carbon atoms); O represents an oxygen atom; $R^1$ is a $C_2$–$C_4$ divalent hydrocarbon radical such as ethylene, propylene or butylene [most preferably the unit $\text{-}(R^1—O)\text{-}_y$ represents repeating units of ethylene oxide, propylene oxide and/or random or block combinations thereof]; y is a number having an average value of from 0 to about 12 (preferably y is zero); Z represents a moiety derived from a reducing saccharide containing 5 to 6 carbon atoms (most preferably a glucose unit) to which the moiety $R—O\text{-}(R^1—O)\text{-}_y$ is attached in the number 1 saccharide position; and x represents the degree of polymerization (D.P.) of said glycoside material and typically is a number having an average value of from 1 to about 10 (preferably from 1 to about 5, more preferably from 1 to about 3, and most preferably from 1 to about 1.5). Lower alkyl monoglycoside materials (especially methyl glucoside) and derivatives thereof are of particular interest for use in the practice of the present invention.

The glycoside materials of the Formula A above can suitably be in the form of the glycoside per se (i.e., wherein the saccharide hydroxyls on the moiety Z in other than the number 1 position are "free" or unsubstituted) or, if desired, one or more of said saccharide hydroxyls can have been derivatized so long as, on average, at least about 2 free hydroxyls are available or remain per glycoside molecule, thereby permitting the resulting glycoside derivative to still function as a true "polyol" within polyester resin manufacturing operation of interest.

Examples of suitable glycoside derivatives of the type noted above for use herein include partial (e.g., mono- and d-) fatty acid/glycoside esters; partial (e.g., mono- and di-) fatty alcohol/glycoside ethers; acetal and ketal derivatives of said glycoside compounds and the like.

Additional glycoside derivatives suitable for use herein also include those of the Formula A above in which one or more of the normally free (i.e., unreacted hydroxyl groups of the saccharide moiety, Z, have been alkoxylated (preferably, ethoxylated or propoxylated) so as to attach one or more pendant alkoxy or poly (alkoxy) groups in place thereof. In such event, the amount of alkylene oxide (e.g., ethylene oxide, propylene oxide, etc.) employed will typically range from about 1 to about 20 (preferably from about 3 to about 10) moles thereof per mole of saccharide moiety within the Formula A glycoside material.

In glycosides of the Formula A above, the $RO(R^1O)\overline{\phantom{x}}_y$ group is generally bonded or attached to the number 1 carbon atom of the saccharide moiety, Z. Accordingly, the free hydroxyls available for alkoxylation are typically those in the number 2, 3, 4 and 6 positions in 6-carbon atom saccharides and those in the number 2, 3 and 4 positions in 5-carbon atom saccharide species. Typically, the number 2 position hydroxyls in 5-carbon saccharides, and the number 2 and 6 position hydroxyls in 6-carbon saccharides, are substantially more reactive or susceptable to alkoxylation than those in the number 3 and 4 positions. Accordingly, alkoxylation will usually occur in the former locations in preference to the latter. Examples of the indicated alkoxylated glycoside materials, and of methodology suitable for the preparation of same, are described in U.S. patent application Ser. No. 06/704,828 filed Feb. 22, 1985 by Roth et al and is incorporated herein by reference.

Partial (e.g., mono- and di-) fatty acid esters and partial (e.g., mono- and di-) fatty ethers of the above-described alkoxylated glycoside materials may also be suitably employed as the glycoside reactant within the practice of the present invention.

In a preferred embodiment of the present invention, the polyester resin produced thereby is an alkyd resin material and, in said embodiment, the characteristic drying oil (e.g., unsaturated fatty acid) modification thereof can be conveniently imparted thereto via the use, as at least a portion of the glycoside component, of a glycoside derivative in which at least one hydroxyl group (but less than all so as to leave an average of at least about 2 free hydroxyls per glycoside molecule) of the saccharide moiety, Z, has been esterified or etherified so as to attach an unsaturated fatty group thereto via an ester or ether linkage. Such fatty acid ester glycoside derivatives can be suitably prepared via a direct esterification reaction between the starting glycoside compound and an unsaturated fatty acid; via an exchange reaction between said glycoside compound and a lower alkyl ester of an unsaturated fatty acid; or via an alcoholysis reaction between said glycoside compound and triglyceride oils such as soybean oil, linseed oil, palm kernel oil, sunflower oil, canola oil, coconut oil, tung oil, and the like. On the other hand, the indicated fatty ether derivatives can be suitably prepared via the reaction of the starting glycoside compound with an unsaturated fatty halide material or other suitable higher alkenyl etherifying reagents.

In an especially preferred embodiment of the invention, a partial unsaturated fatty acid ester/glycoside derivative of the type described above is employed in the preparation of an alkyd resin product. In said embodiment, such glycoside/fatty acid ester derivative is preferably prepared in advance of the polycarboxylic acid/polyol esterification reaction by way of a preliminary alcoholysis reaction between a starting glycoside compound (i.e., of the Formula A above in which the saccharide hydroxyls of the moiety Z are in free or unreacted form) and an oil such as soybean oil, linseed oil, palm kernel oil, sunflower oil, canola oil, coconut oil, tung oil and the like. Such preliminary alcoholysis reaction is preferably conducted in accordance with the alcoholysis procedures which are described in further detail hereinbelow.

While the aforementioned glycoside material can constitute the sole polyol reactant in the present process, it will more commonly be employed as a portion of a polyol mixture containing one or more other polyol components such as, for example, ethylene glycol, glycerol, pentaerythritol, mixtures of mono-, di- and triglycerides and the like. Advantageously, said glycoside material will constitute from about 10 to 100 (preferably from about 50 to about 90) weight percent of said polyol mixture.

In preparing the aforementioned polyol mixture (i.e., in advance of the polyol/polybasic acid or anhydride esterification reaction which is ultimately of interest) a number of alternatives are applicable. Thus, for example, the glycoside reactant of interest can simply be admixed in the chosen proportion with any other desired polyol components (e.g., ethylene glycol, glycerol, pentaerythritol, admixed mono-, di- and triglycerides, and the like) prior to said esterification reaction. On the other hand, when the polyol mixture of interest is to contain mono- and/or diglycerides, the glycoside reactant can be employed in an alcoholysis reaction in which said glycoside reactant (either with or without other polyols such as ethylene glycol, glycerol, pentaerythritol, etc.) are transesterified with a triglyceride oil to thereby form a polyol mixture comprising mono- and diglycerides, mono-, di-, tri- and tetra-fatty acid/glycoside esters and the like. Alternatively still, such an alcoholysis reaction can be separately conducted as between a non-glycoside polyol such as ethylene glycol, glycerol, pentaerythritol etc. and the aforementioned triglyceride oil and the resulting alcoholysis product can thereafter be admixed with the glycoside reactant prior to the reaction of the resulting polyol mixture.

Suitable non-glycoside polyol components for use as a copolyol ingredient either in the esterification reaction itself or in a preliminary alcoholysis reaction (if any) or in both types of reactions include ethylene glycol, 1, 3-butanediol, 1,4-butanediol, cyclohexanedimethanol, diethylene glycol, dimethylol propionic acid, dipropylene glycol, 1,6-hexanediol, hexylene glycol, neopentyl glycol, 1,5-pentanediol, propylene glycol, tetraethylene glycol, triethylene glycol, trimethylene glycol, trimethyl pentanediol, glycerol, trimethylol ethane, trimethylol propane, pentaerythritol, and the like.

In an embodiment of particular interest, the polyester resin to be prepared is an alkyd resin and the glycoside-containing polyol component employed in the esterification reaction to produce same further comprises a glyceride mixture predominantly composed of mono- and di-glycerides in which at least about 35 weight percent of said glyceride mixture is composed of monoglyceride material. In said embodiment, the indicated polyol mixture is preferably prepared by an alcoholysis process in which a triglyceride oil (preferably soybean oil, coconut oil or linseed oil) is transesterified with a starting glycoside reactant of the Formula A above in which the saccharide hydroxyls of the moiety Z are in free or unreacted form prior to said alcoholysis reaction. Typically, said alcoholysis reaction is conducted at a temperature of from about 200° to about 270° C. (preferably from about 235° to about 250° C.) and in the presence of a transesterification catalyst such as lithium carbonate, lithium hydroxide, potassium hydroxide, lithium ricinoleate, dibutyltin oxide or titanate esters until equilibrium is reached. The molar ratio of triglyceride oil to glycoside reactant in said alcoholysis reaction is typically in the range of from about 1.0:0.5 to about 1.0:2.25 (preferably from about 1.0:1.1 to about 1.0:1.3) and said reaction is preferably conducted in a fashion such that the resulting reaction product contains less than 1% glycerol. It is also generally preferred that the residual free or unreacted glycoside content remaining following the alcoholysis reaction be less than about 8 (more preferably less than about 5 and most preferably less than about 3) weight percent on a total alcoholysis product weight basis. Typically, the triglyceride oil employed in said alcoholysis reaction will be of the type predominantly containing unsaturated fatty acid groups of from about 6 to about 24 (preferably from about 8 to about 20) carbon atoms.

With regard to the aforementioned alcoholysis reaction, it has been observed that undesirably high color levels can develop within the resulting alcoholysis product and that same can carry through and impart or contribute undesirable or unacceptable color characteristics to the ultimate alkyd resin product of interest. Thus, in order to facilitate obtaining of acceptable color characteristics in the final alkyd resin product of concern, it has been found to be important to conduct said alcoholysis process in a fashion such that color development or generation is minimized (or at least kept to acceptably low levels) during the course of said alcoholysis reaction. Typically, if the alcoholysis product has a Gardner color (as measured while still hot following the alcoholysis reaction) of from about 2 to about 9 (preferably about 2 to about 5), then it will be suitable for use in the preparation of acceptable color alkyd resins in accordance with the present invention.

In connection with the foregoing, one approach for obtaining acceptable color alcoholysis product is to conduct the alcoholysis reaction by heating the triglyceride oil and transesterification catalyst (e.g., lithium or sodium compounds) under an inert atmosphere to about 270° C.; then adding the glycoside starting material (i.e., of the Formula A above having its saccharide hydroxyls in free or unreacted form) gradually or incrementally (e.g., in 3 or 4 spaced incremental additions) over a 30 minute period, being careful not to permit the reaction temperature to fall below about 260° C. during said glycoside additions; and thereafter continuing said reaction for about 1 to 1½ hours at about 260° C. See in this regard the methyl glucoside alcoholysis procedure which is described in U.S. Pat. No. 3,321,419 (issue May 23, 1967 to Harry M. Kennedy) and in "Methyl Glucoside" J. P. Gibbons, *Paint and Varnish Production,* Vol. 48, No. 11, October, 1958 (pages 57–63) and which is incorporated herein by reference.

Another approach which has been found to be suitable for obtaining acceptable color alcoholysis product for use herein involves initially admixing the triglyceride oil, an effective amount (e.g., on the order of about 0.4 to 0.6 weight percent based upon the weight of the triglyceride oil only) of the transesterification catalyst (e.g., lithium hydroxide monohydrate) and the glycoside reactant together at ambient temperature along with from about 2 to about 10 weight percent (preferably about 2 weight percent) water on a total reaction mixture weight basis; thereafter raising the temperature of said mixture to a reaction temperature of from about 230°–250° C., during which time water vapor is removed from the reaction mixture; and conducting the reaction at said temperature (typically with moderate to vigorous agitation) for a period of approximately an hour or so. Upon completion of said reaction, the resulting hot alcoholysis product should be capable of dissolving at least about 3 parts by volume methanol in one part by volume of said alcoholysis product without exhibiting a visibly detectable cloud point, thereby evidencing essentially complete conversion of the triglyceride starting material to mono- and diglyceride reaction products.

In connection with this latter alcoholysis procedure, it has been found that the inclusion of water in the reaction mixture as indicated above substantially reduces the propensity of undesirably or unacceptably high color levels to develop in the alcoholysis product during the preparation thereof. Further, it has been additionally found that the inclusion of water in the glycoside/triglyceride oil alcoholysis reaction substantially increases the degree of conversion of the glycoside reactant to the desired glycoside ester alcoholysis product and thereby substantially reduces (e.g., by a factor of as much as 2 or 3) the amount of residual, unreacted glycoside material within the resulting alcoholysis product. Additionally, it is also beneficial and preferably in said reaction to conduct same under neutral or alkaline conditions. Further, it is also preferred to employ a non-glycoside copolyol material such as, for example, glycerol, pentaerythritol, ethylene glycol and the like in conjunction with the glycoside starting material in the foregoing alcoholysis reaction. Advantageously, said copolyol material will normally be employed in an amount ranging from about 10 to about 90 (especially about 30 to 70) weight percent of the total polyol reactant weight. Typically, the inclusion of such a non-glycoside copolyol material (in conjunction with the inclusion of water as hereinbefore described) provides even further improvement in the color characteristics of the resulting alcoholysis product.

As yet another way of preparing glycoside-containing alkyd resins in accordance with the present invention, it should be noted that direct esterification technique may also be satisfactorily employed. Thus, in accordance with this particular alternative, a glycoside reactant of the Formula A above whose saccharide hydroxyls are in free or unsubstituted form is directly admixed (either with or without a non-glycoside copolyol, as desired) with the desired proportion of an unsaturated fatty acid and with the desired polybasic acid or anhydride reactant and are thereafter directly esterified in accordance with the improved esterification reaction process hereof to form the alkyd resin product of interest.

Polybasic acid or anhydride reactants suitable for use herein include both aromatic polybasic acids or anhydrides as well as aliphatic polybasic acids and anhydrides. It has, however, been observed that undesired color development problems can particularly pronounced or severe in the case of glycoside-containing polyester or alkyd resin products based upon or derived from aromatic polybasic acids or anhydrides such as, for example, ortho phthalic acid, ortho phthalic anhydride, and the like. Fortunately, it has now been discovered that the rather severe color development problems normally encountered with aromatic polybasic acid or anhydride-based, glycoside-containing polyester or alkyd resin products can be substantially alleviated or avoided by replacing a minor proportion of said aromatic polybasic acid or anhydride with an aliphatic polybasic acid or anhydride and by then conducting the esterification reaction itself in accordance with the improved esterification process described herein. Accordingly, a particularly advantageous embodiment of the present invention resides in a highly improved esterification reaction for preparing a glycoside-containing, aromatic polybasic acid or anhydride-based polyester or alkyd resin:

(a) wherein a minor proportion of said aromatic dibasic acid or anhydride is replaced by an aliphatic dibasic acid or anhydride; and (b) wherein said esterification reaction is conducted at a temperature below about 185° C. until said reaction is at least about 50 percent complete.

The amount of the aliphatic dibasic acid or anhydride component employed in the preceding embodiment is not particularly critical. However, it will generally constitute a minor proportion (i.e., less than about 50 percent) of the combined weight of itself and the aromatic dibasic acid or anhydride component in order that the dibasic acid or anhydride constituent of the polyester or alkyd resin of interest continues to be predominantly composed of said aromatic dibasic acid or anhydride. Preferably said dibasic aliphatic acid or anhydride component will constitute from about 1 to about 30 (most preferably from about 5 to about 15) weight percent of the combined aromatic and aliphatic dibasic acid or anhydride component weight.

Aromatic polybasic acid or anhydride materials suitable for use herein include orthophthalic acid, orthophthalic anhydride, isophthalic acid, terephthalic acid, trimelitic anhydride, and the like. Of these, phthalic anhydride is one of the more commonly utilized dibasic acid material employed in conventional polyester or alkyd resin manufacturing operations and is of particular interest for use in the improved process of the present invention.

Suitable aliphatic polybasic acid or anhydride components for use herein include both saturated and unsaturated aliphatic polybasic acids or anhydrides and thus include malic acid, tartaric acid, adipic acid, succinic acid, succinic anhydride, sebacic acid, azelaic acid, citric acid, cyclohexane dicarboxylic acid, etc. as well as maleic acid, maleic anhydride, fumaric acid, citraconic acid, itaconic acid, tetrahydrophthalic anhydride, aconitic acid, and the like. Of the foregoing dibasic acids and anhydrides, the various unsaturated aliphatic acids and anhydrides (especially maleic acid, maleic anhydride, fumaric acid and tetrahydrophthalic anhydride) are particularly preferred for use in the practice of the present invention.

As has been mentioned briefly above, it has been conventional practice to prepare polyester of alkyd resin materials by reacting or esterifying an aliphatic or aromatic dibasic acid or anhydride such as maleic anhydride, adipic acid, phthalic anhydride or the like at an elevated temperature with a polyol material (e.g., in the case of alkyd resins, typically a monoglyceride material derived from the alcoholysis of glycerol and a triglyceride oil). Typically, such esterification reaction is conducted at a temperature in the range from about 230° to about 240° C. As has also been noted, previous attempts to prepare alkyd resins by reacting phthalic anhydride with the alcoholysis product of methyl glucoside and a triglyceride oil have been reported to result in very dark colored products.

Glycoside-containing polyester or alkyd resin materials having notably improved color characteristics are provided in accordance with the present invention by modifying or changing an otherwise relatively conventional dibasic acid or anhydride/polyol esterification reaction. More specifically, when the dibasic acid or anhydride component to be employed is an aromatic acid or anhydride one significant, preferred feature of the improved process of the present invention is the incorporation, as discussed hereinabove, of a minor proportion of an aliphatic dibasic acid or anhydride into the aromatic dibasic acid or anhydride component. Particularly preferred aliphatic polybasic acids for use in such fashion are the various unsaturated polybasic aliphatic acids and anhydrides, especially maleic acid, maleic anhydride, fumaric acid, and tetrahydrophthalic anhydride.

An especially significant feature of the improved process of the present invention relates to the temperature at which the esterification reaction between the polyol component and the dibasic acid or anhydride component is conducted. As has been noted above, conventional polyester or alkyd resin esterification reaction between aliphatic or aromatic dibasic acid or anhydride materials such as phthalic anhydride and polyol reactants such as, for example, monoglyceride-containing polyol mixtures, are typically conducted at a temperature in the range of about 230°–240° C. In contrast, in accordance with the improved process of the present invention, the esterification reaction temperature is maintained below about 185° C. (preferably at a temperature in the range of from about 170° to about 185° C.) until the esterification reaction between the polyol reactant and the dibasic acid or anhydride component has reached at least about 50 (preferably at least about 75, more preferably at least about 80 and most preferably at least about 90) percent of completion. Thereafter, the reaction temperature can, if desired, be raised to a substantially higher level (e.g., typically in the range of from about 190° to about 230° C.) in order to complete said esterification reaction.

As a practical matter, determination of when the esterification reaction of interest has reached the desired degree of completion (i.e., prior to the raising reaction temperature) can be conventiently accomplished by calculating the total amount of water which will have been released during the entire course (i.e., upon completion) of said reaction and by monitoring the cumulative amount of water generated, acid value and viscosity as the reaction proceeds toward completion. The proportion or fraction of water generated at a given stage or point within said esterification reaction (i.e., taken as a fraction of the total water which will have been generated upon total completion of said reaction) is proportionate to (or reflective of) the degree of completion of said reaction. Accordingly, that parameter provides a convenient means of determining when the reaction has achieved the desired degree of completion in advance of any desired increase in reaction temperature to a level above the 185° C. limit noted above. Naturally, the theoretical upper limit upon the amount of water to be generated upon completion of the esterification reaction will depend upon the nature and amounts of the polyol and dibasic acid or anhydride components employed and upon which of those key components (i.e., the polyol reactant or the acid or anhydride component) is employed in a limiting quantity. As a general rule, however, the polyol reactant component will be employed in some excess and the acid or anhydride material will thus usually be the reaction or polymerization-limiting ingredient.

In practicing the improved process of the present invention, the aforementioned polyol/dibasic acid or anhydride esterification reaction will typically be conducted in the presence of an acid catalyst such as, for example, those conventionally employed in polyester or alkyd resin preparation processes. Acid catalysts of particular interest for use herein include reducing acids such as hypophosphorous acid and triphenyl phosphite. Additionally, phosphoric acid has also been found to be a particularly beneficial acid catalyst for use in the improved process of the present invention.

Other features, aspects or parameters employed in conjunction with the improved process of the present invention will generally correspond to those normally employed in conventional polyester or alkyd resin preparation processes. Thus, for instance, (and as is customary) the esterification reaction herein will generally be conducted under an inert gaseous atmosphere as, for example, may be conveniently provided by sparging the reaction vessel with a relatively low volumetric flow rate (e.g., such as about 1 cubic foot per hour) of an inert gaseous material such as nitrogen, carbon dioxide, or the like. Similarly, removal of water of condensation generated during the esterification reaction will generally be facilitated by the inclusion of an organic solvent such as xylene to promote azeotropic distillation of an organic solvent/water mixture during the course of said reaction. Naturally, various other conventional aspects, features, techniques or considerations will be readily apparent to those of normal skill in the art of polyester and/or alkyd resin preparation.

The present invention is further illustrated by reference to the following examples thereof in which, unless otherwise specified, all parts and percentages are on a weight basis, all temperatures are stated in ° C. and all pressures are in K Pascals (Kpa) relative to normal atmospheric pressure.

EXAMPLES 1–3

In these examples, long oil alkyd resins are prepared in accordance with the recipes set forth in Table A below.

As an initial process step, the soy oil is subjected to alcoholysis by reacting same (under a nitrogen sparge) with the methyl glucoside and the glycerol in the presence of the lithium hydroxide catalyst for about 1 hour at 230°–235° C.

Following the alcoholysis reaction, the resulting alcoholysis reaction product predominantly composed of a mixture of monoglycerides, diglycerides, mono-, di- and tri-fatty acid esters of methyl glucoside and very small amounts of free glycerol, free methyl glucoside, triglyceride and tetra-fatty acid esters of methyl glucoside is cooled to about 190°-200° C. at which point about 2 grams of triphenyl phosphite (TPP) is added thereto and the resulting mixture is stirred for 2-3 minutes. Thereafter the phthalic anhydride, the fumaric or maleic acid, the hypophosphorous acid catalyst ($H_3PO_2$) and the xylene are also added to the reaction mixture and the reaction is conducted (under a nitrogen sparge) at a temperature of 180°-185° C. until the esterification reaction is about 80-85% complete (i.e., as reflected by about 80-85% of the total, upon-completion, theoretical water of condensation having been liberated from the reaction mixture and collected in a water trap connected to the reaction vessel). The esterification reaction is then completed by raising the reaction temperature to 200°-210° C. and continuing the reaction to the desired degree of completion (in this case as reflected by an acid value of less than about 12).

As can be seen from the results in Table A, the color of the alkyd resin of Example 1 is in the range of 5-6 and, similarly, the color for the resin of Example 2 is about 6. In Example 3 in which no fumaric or maleic acid is employed along with the phthalic anhydride, the color of the resulting alkyd resin product is seen to be 12, thereby illustrating the benefits of utilizing a minor proportion of an aliphatic dicarboxylic acid or anhydride in conjunction with aromatic dibasic acids of anhydrides such as phthalic anhydride.

TABLE A

| | Example 1 | Example 2 | Example 3 |
|---|---|---|---|
| INGREDIENTS[1] | | | |
| Alkali Refined Soy Oil | 1.31 | 1.31 | 1.97 |
| Methyl glucoside | 0.13 | 0.13 | 0.13 |
| Glycerol | 0.88 | 0.88 | 1.32 |
| Phthalic Anhydride | 1.15 | 1.15 | 1.91 |
| Fumaric Acid | 0.13 | — | — |
| Maleic Acid | — | — | — |
| PARAMETERS, CATALYSTS & RESULTS | | | |
| % Ex OH[2] | 14.3 | 14.3 | 14.6 |
| Theoretical OH No.[3] | 47.8 | 47.8 | 48.2 |
| K-Value[4] | 1.04 | 1.04 | 1.04 |
| Final Color[5] | 5-6 | 6 | 12 |
| Final Acid Value[6] | 8.3 | 6.2 | 9.9 |
| G-H Viscosity (% 70% HVM) | Z-3 | X-Y | Z-3/Z-4 |
| LiOH/gm | 0.6 | 0.6 | 0.9 |
| $H_3PO$ hd 2(50%) | 3.0 | 3.0 | 3.0 |
| Xylene/ml | 100 | 110 | 110 |

[1]Ingredient amounts are stated in equivalents
[2]Reflects calculated theoretical percent excess hydroxyl.
[3]Reflects calculated theoretical hydroxyl number.
[4]Reflects T.C.Patton calculated alkyd gel constant.
[5]Determined by Gardner Color Standards.
[6]Determined by ASTM D-1639 Method.

By way of comparison, a Control experiment corresponding essentially to Examples 1 and 2 is conducted except that the fumaric and maleic acid components are not included and the esterification reaction temperature is maintained at 200°-210° C. throughout the course of the entire reaction. Following said experiment, the color of the resulting resin product is determined to be in the range of 13-14.

While the subject matter hereof has been described and illustrated with reference to particular embodiments and examples thereof, such is not to be interpreted as in any way limiting the scope of the presently claimed invention.

What is claimed is:

1. In a process for preparing a polyester resin by the reaction of an aromatic polybasic acid or anhydride with a polyol reactant containing at least a minor proportion of an alkyl, alkenyl or aryl glycoside or polyglycoside material at an elevated temperature, the improvement comprising:

a. replacing a minor proportion of said aromatic polybasic acid or anhydride with an aliphatic polybasic acid or anhydride; and b. conducting said reaction in a fashion such that the reaction temperature is maintained below about 185° C. until at least about 50 percent of the total carboxyl groups of the combined acid or anhydride components have been reacted to form ester functionalities.

2. The process of claim 1 wherein the aliphatic polybasic acid or anhydride constitutes from about 1 to about 30 weight percent of the combined weight of itself and the aromatic acid or anhydride.

3. The process of claim 2 wherein the aliphatic polybasic acid or anhydride is selected from the group consisting of fumaric acid, maleic acid, maleic anhydride and tetrahydrophthalic anhydride.

4. The process of claim 1 wherein the reaction temperature is maintained below about 185° C. until at least about 75 percent of the total carboxyl groups of the combined acid or anhydride components have been reacted to form ester functionalities.

5. The process of claim 1 wherein the reaction temperature is maintained within a range of from about 170° to 185° C. until at least about 90 percent of the total carboxyl groups of the combined acid or anhydride components have been reacted to form ester functionalities.

6. The process of claim 1 wherein polyol reactant further comprises a glyceride mixture predominantly composed of mono- and diglycerides in which at least about 35 weight percent of said glyceride mixture is composed of monoglyceride material.

7. The process of claim 1 wherein the alkyl, alkenyl or aryl glycoside or polyglycoside component constitutes from about 10 to about 100 percent of the total weight of the polyol reactant.

8. The process of claim 1 wherein the reaction between the polyol reactant and the acid or anhydride is conducted in the presence of an acid catalyst.

9. The process of claim 8 wherein the acid catalyst is a reducing acid.

10. The process of claim 8 wherein the acid catalyst is selected from the group consisting of phosphoric acid, hypophosphorous acid, and triphenylphosphite.

11. The process of claim 1 wherein the aromatic acid or anhydride component is an aromatic dibasic anhydride.

12. The process of claim 1 wherein the aromatic acid or anhydride component is phthalic anhydride.

13. The process of claim 1 wherein the glycoside or polyglycoside component is a lower alkyl monoglycoside or a derivative thereof.

14. The process of claim 1 wherein the glycoside or polyglycoside component is a lower alkyl monoglucoside or a derivative thereof.

15. The process of claim 1 wherein the glycoside or polyglycoside component is methyl glucoside or a derivative thereof.

16. The process of claim 1 wherein the polyester resin is an alkyd resin and wherein the glycoside reactant comprises an unsaturated fatty acid ester derivative of an alkyl, alkenyl or aryl glycoside or polyglycoside material.

17. The process of claim 16 wherein the polyol reactant further comprises a glyceride mixture predominantly composed of mono- and diglycerides in which at least 35 weight percent of said glyceride mixture is a monoglyceride material.

18. The process of claim 17 wherein the polyol reactant comprises the reaction product of an alcoholysis reaction in which a glycoside reactant is transesterified which is triglyceride oil.

* * * * *